United States Patent [19]

Urbanski et al.

[11] Patent Number: 5,392,426
[45] Date of Patent: Feb. 21, 1995

[54] METHOD AND APPARATUS FOR USE IN PROGRAM OPERATION, CONTROL AND CONTROL BLOCK MANAGEMENT AND STORAGE

[75] Inventors: Artur Urbanski, Westport, Conn.; Douglas Hoople, Somers, N.Y.

[73] Assignee: Nynex Corporation, Inc., New York, N.Y.

[21] Appl. No.: 6,688

[22] Filed: Jan. 21, 1993

Related U.S. Application Data

[63] Continuation of Ser. No. 452,065, Dec. 15, 1989, abandoned.

[51] Int. Cl.⁶ ............................................. G06F 13/00
[52] U.S. Cl. ................................. 395/650; 395/200; 364/DIG. 1; 364/284.3; 364/284
[58] Field of Search ................... 364/DIG. 1, DIG. 2

[56] References Cited

U.S. PATENT DOCUMENTS

| | | | |
|---|---|---|---|
| 4,101,960 | 7/1978 | Stokes et al. | 395/800 |
| 4,104,718 | 8/1978 | Poublan et al. | 364/200 |
| 4,325,120 | 4/1982 | Colley et al. | 364/200 |
| 4,413,318 | 11/1983 | Herrington | 364/200 |
| 4,435,780 | 3/1984 | Herrington et al. | 364/900 |
| 4,500,960 | 2/1985 | Babecki et al. | 364/200 |
| 4,586,134 | 4/1986 | Norstedt | 364/200 |
| 4,658,351 | 4/1987 | Teng | 364/200 |
| 4,694,396 | 9/1987 | Weisshaar et al. | 364/300 |
| 4,736,318 | 4/1988 | Delyani et al. | 364/200 |
| 4,769,771 | 9/1988 | Lippmann et al. | 364/200 |
| 4,791,566 | 12/1988 | Sudama et al. | 364/200 |
| 4,825,354 | 4/1989 | Agrawal et al. | 364/200 |
| 4,835,685 | 5/1989 | Kun | 364/200 |
| 4,897,780 | 1/1990 | Lakness | 364/200 |
| 4,918,595 | 4/1990 | Kahn et al. | 364/200 |
| 4,949,254 | 8/1990 | Shorter | 364/200 |
| 5,043,881 | 8/1991 | Hamazaki | 395/700 |
| 5,062,037 | 10/1991 | Shorter et al. | 364/200 |

*Primary Examiner*—Kevin A. Kriess
*Assistant Examiner*—Lucien Toplu
*Attorney, Agent, or Firm*—Loren Swingle; John J. Torrente

[57] ABSTRACT

Apparatus including a program formed from Layered Procedure Sets and providing control for the program such that the message event blocks established for a session of the program are uniquely identifiable to the session and such that a single control block is established for a Layered Procedure Set during a session, the control block being uniquely identifiable to the Layered Procedure Set based on the particular session and the identification of the Layered Procedure set.

16 Claims, 20 Drawing Sheets

| Queue Element | ORIGIN | DESTINATION | EVENT | DATA COUNT | DATA Ptr | USER DATA Ptr | SESSION KEY |
|---|---|---|---|---|---|---|---|

↳ MEB

```
Notes:  #MEB's = 0
        Ready^q = null, Dispatch^q = null, Io^ = null;

Session context:
    null

1. Proc Example main;

@MEB := create^MEB;        -- session^key = A
    MEB.origin := -1;          -- doesn't matter
    MEB.desitnation :=lpsa^id;
    MEB.event := event^term^init;
    call enqueue( ready^q, MEB );

Notes:  #MEB's = 1.  On queue.
        Ready^q = MEB(A), Dispatch^q = null, Io^q = null;

Session context:
    A=null
```

```
2.  proc example main;

@MEB := create^MEB;        --session^key = B
    MEB.origin := -1;          -- doesn't matter
    MEB.destination :=lpsa^id;
    MEB.event := event^term^init;
    call enqueue( ready^q, MEB );

call scheduler;   -- This is the last statement in
                          the initialization code.

Notes:  #MEB's = 2.  All on queue.

Ready^q = MEB(A), MEB(B), Dispatch^q = null, Io^q = null;

Session context:
    A=null
    B=null
```

```
3.  proc scheduler while ready^q.q^count do
        @MEB :=dequeue( ready^q );
        call enqueue( dispatch^q, MEB );
        call dispatcher;

Notes:  #MEB's = 2.  All on queue.
        Ready^q = MEB(B), Dispatch^q = MEB(A), io^q = null
```

*FIG. 8*

```
4. proc dispatcher while dispatch^q.q^count do
       @MEB := dequeue( dispatch^q, MEB );
       since ecb.destination = lpsa^id
         call lpsa( MEB );

Note:  #MEB's = 2.  One passed as parameter to LPS,
                   one on queue.
       Ready^q = MEB(B), Dispatch^q = null, io^q = null;
       MEB(A) being passed to LPSA;
```

```
5. proc lpsa since event = event^term^init
        call lpsa^term^init;

proc laps^term^init
     @lpsa^cb := allocate^cb( lpsa^id, MEB.session^key,
                 $len(lpsa^cb^def) ):
     @MEB.data := get^buffer( $len(terminal^io^rec^len) );
     MEB.data^count := $len(terminal^io^rec^len);
     MEB.event :=event^do^terminal^io;
     MEB.origin :=lpsa^id;
     MEB.destination := -1;
     call enqueue( io^q, MEB );
     return;

proc lpsa
     return;

proc dispatcher
     return;

Note:  #MEB's = 2.  All on queue.
       Ready^q = MEB(B), Dispatch^q = null, io^q = MEB(A);

Session context:
   A=lpsa^cb
   B=null

**  ================= End of Dispatch Cycle
```

```
6. proc scheduler while ready^q.q^count do
       @MEB :=dequeue( ready^q );
       call enqueue( dispatch^q, MEB );
       call dispatcher;

Notes: #MEB's = 2.  All on queue.
       Ready^q = MEB(B), Dispatch^q = MEB(B), io^q = MEB(A);
```

FIG. 9

```
7.   proc dispatcher while dispatch^q.q^count do
        @MEB := dequeue( dispatch^q, MEB );
        since ecb.destination = lpsa^id
           call lpsa( MEB );

Note:   #MEB's = 2.   One passed as parameter to LPS,
                      one on queue.
        Ready^q = null, Dispatch^q = null, io^q = MEB(A);
        MEB(A) being passed to LPSA;
```

```
8.   proc lpsa since event = event^term^init
         call lpsa^term^init;

proc lpsa^term^init
        @lpsa^cb := allocate^cb( lpsa^id, MEB.session^key,
                    $len(lpsa^cb^def) ):
        @MEB.data := get^buffer( $len(terminal^io^rec^len) );
        MEB.data^count := $len(terminal^io^rec^len);
        MEB.event :=event^do^terminal^io;
        MEB.origin :=lpsa^id;
        MEB.destination := -1;
        call enqueue( io^q, MEB );
        return;

proc lpsa
     return;
  proc dispatcher
     return;

Note:  #MEB's = 2.  All on queue.
       Ready^q = null, Dispatch^q = null, io^q = MEB(A), MEB(B);

Session context:
    A=lpsa^cb
    B=lpsb^cb

**   ========================= End of Dispatch Cycle
```

FIG. 10

```
9.  proc Scheduler since ready^q.q^count = 0
        fall through to:

while io^q.q^count do
        @MEB := dequeue( io^q );
        call do^io( MEB );

proc do^io

--Internal IO processing here.
        return;

Note:  #MEB's = 2.  One on queue.  One in IO.
          Ready^q = null, Dispatch^q = null, io^q = MEB(B)
          MEB(A) in IO.
```

```
10.  proc Scheduler while io^q.q^count do
         @MEB :=dequeue( io^q );
         call do^io( MEB );

proc do^io

-- Internal IO processing here.
         return;

proc Scheduler since io^q.q^count = 0
           fall through to:
         call wait^on^io;

Note:  #MEB's = 2.  All in IO.
           Ready^q = null, Dispatch^q = null, io^q = null
           MEB(A), MEB(B) in IO.

**=============================== End of Scheduler Cycle
```

FIG. 11

```
11.  proc wait^on^io
        --IO completes on terminal opened for MEB(B)
        MEB.destination := MEB.origin --This is lpsa^id.
        MEB.origin := -1;  -- doesn't matter
        MEB.event := event^terminal^io^done
        call enqueue( ready^q, MEB );
        return
```

```
12.  proc scheduler fall through to top of loop:

while ready^q.q^count do
            @MEB := dequeue( ready^q );
            call enqueue( dispatch^q, MEB );
            call dispatcher;

Notes: #MEB's = 2.  One on queue, one in IO.
    Ready^q = MEB(B), Dispatch^q = null, io^q = null;
    MEB(A) in IO.
```

```
13.  proc dispatcher
        while dispatch^q.q^count do
            @MEB :=dqueue( dispatch^q, MEB );
            since ecb.destination = lpsa^id
              call lpsa( MEB );

Note:  #MEB's = 2.  One passed as parameter to LPS, one in IO.
    Ready^q = null, Dispatch^q = null, io^q = null;
    MEB(B) being passed to LPSA;
    MEB(A) in IO.
```

```
14.  proc lpsa since event = event^terminal^io^done
            call lpsa^terminal^io^done proc lpsa^terminal^io^done
            @lpsa^cb := find^cb( lpsa^id, MEB.session^ key );
            -- update data transfer control states
            .
            .
            .
            -- Now set up to perform a query from lpsb
            MEB.destination := lpsb^id;
            MEB.origin :=lpsa^id;
            MEB.event := event^data^in;
            call enqueue( dispatch^q, MEB );
            return;

Note:   #MEB's = 2.  One on queue, one in IO.
        Ready^q = null, Dispatch^q = MEB(B), io^q = null;
        MEB(A) in IO.

proc lpsa
        return;
```

FIG. 12

```
15.  proc dispatcher;

-- continuing with ...
        while dispatch^q.q^count do
          @MEB := dequeue( dispatch^q );
          since MEB.distination = lpsb^id
            call lpsb( MEB );
```

```
16.  proc lpsb
        since ecb.event = event^data^in
          call lpsb^data^in( meb )

proc lpsb^data^in
        @lpsb^cb : = find^cb( lpsb, meb.session^key );
        if @lpsb^cb <= 0 then
          -- This must be a new session... Time to allocate a fresh CB
          @lps^cb := allocate ^cb( lpsb^id, meb.session^key,
          $len(lpsb^cb^def) );
     --update application data states.
        .
        .
        .
        --set up disk IO
        meb.destination := -1;  -- to handler.  doesn't matter
        meb.origin := lpsb^id;
        meb.event := event^do^disk^io;
        call enqueue( io^q, meb );
        return;

Note:   #MEB's = 2.  One on queue, one in IO.
        Ready^q = null, Dispatch^q = null, io^q = meb(B);
        MEB(A) in IO.

proc lpsb;
       return proc dispatcher;

since dispatch^q.q^count = 0
         return;

*  ================================================  End of Dispatch Cycle
```

```
17.  proc Scheduler
             since ready^q.q^ count = 0
               fall through to:

while io^q.q^count do
               @MEB :=dequeue( io^q );
               call do^io( MEB );

MEB(A),  MEB(B)  in IO.
**  ================================================  End of Scheduler Cycle
```

proc do^io

-- Internal IO processing here.
      return;

proc Scheduler since io^q.q^count = 0
         fall through to:
      call wait^on^io;

Note: #MEB's = 2. All in IO.
      Ready^q = null, Dispatch^q = null, io^q = null 18. proc wait^on^io
      -- IO completes on terminal opened for MEB(A)
      MEB.destination :=MEB.origin -- This is lpsa^id.
      MEB.origin := -1;  -- doesn't matter
      MEB.event := event^terminal^io^done
      call enqueue( ready^q, MEB );
      return;

proc scheduler fall through to top of loop:

while ready^q.q^count do
         @MEB := dequeue( ready^q );
         call enqueue( dispatch^q, MEB );
         call dispatcher;

Notes: #MEB's = 2. One on queue, one in IO.
       Ready^q = MEB(A), Dispatch^q = null, io^q = null;
       MEB(B) in IO.

FIG. 14

```
19.  proc dispatcher while dispatch^q.q^count do
              @MEB := dequeue( dispatch^q. MEB );
              since ecb.destination = lpsa^id
                call lpsa( MEB );

Note:     #MEB's = 2.  One passed as parameter to LPS, one in IO.
          Ready^q = null, Dispatch^q = null, io^q = null;
          MEB(A) being passed to LPSA;
          MEB(B) in IO.
```

```
20.  proc lpsa since event = event^terminal^io^done
             call lpsa^terminal^io^done proc lpsa^terminal^io^done
            @lpsa^cb := fine^cb( lpsa^id, MEB.session^key );
            -- update data transfer control states
            .
            .
            .
            -- Now set up to perform a query from lpsb
            MEB.destination := lpsb^id;
            MEB.origin := lpsa^id;
            MEB.event :=event^data^in;
            call enqueue( dispatch^q, MEB );
            return;

Note:     #MEB's = 2.  One on queue, one in IO.
          Ready^q = null, Dispatch^q = MEB(A), io^q = null;
          MEB(B) in IO.

proc lpsa
          return;
```

FIG. 15

```
21. proc dispatcher;
        -- continuing with ...
        while dispatch^q.q^count do
            @MEB := dequeue( dispatch^q );
            since MEB.destination = lpsb^id
                call lpsb( MEB );
```

```
22. proc lpsb
        since ecb.event = event^data^in
            call lpsb^data^in( meb )
    proc lpsb^data^in
        @lpsb^cb := find^cb( lpsb, med.session^key );
        if @lpsb^cb <= 0 then
            -- This must be a new session... Time to allocate a fresh CB
            @lps^cb := allocate^cb( lpsb^id, med.session^key,
            $len(lpsb^cb^def) );

-- update application data states.
    .
    .
    .
    -- set up disk IO
    meb.destination := -1;   -- io handler.  doesn't matter
    meb.origin := lpsb^id;
    meb.event := event^do^disk^io;
    call enqueue( ko^q, meb );
    return;

Note:   #MEB's = 2.  One on queue, one in IO.
        Ready^q = null, Dispatch^q = null, io^q = MEB(A);
        MEB(B) in IO.

proc lpsb;
    return proc dispatcher;
    since dispatch^q.q^count = 0
    return;

*  ================================  End of Dispatch Cycle
```

```
23. proc Scheduler
        since ready^q.q^count = 0
            fall through to:

while io^q.q^count do
            @MEB := dequeue( io^q );
            call do^io( MEB );
```

*FIG. 16*

```
                24.  proc do^io

-- Internal IO processing here.
                         return;

proc Scheduler since io^q.q^count = 0
                           fall through to:
                         call wait^on^io;
```

Note:  #MEB's = 2.  All in IO.
       Ready^q = null, Dispatch^q = null, io^q = null
       MEB(B), MEB(A) in IO.

**  ================================================ End of Scheduler Cycle

*FIG. 17*

```
25.  proc wait^on^io
         -- IO completes on terminal opened for MEB(B)
         MEB.destination := MEB.origin -- This is lpsb^id.
         MEB.origin := -1;  -- doesn't matter
         MEB.event := event^terminal^io^done
         call enqueue( ready^q, MEB );
         return
```

```
26.  proc scheduler fall through to top of loop;

while ready^q.q^count do
            @MEB := dequeue( ready^q );
            call enqueue( dispatch^q, MEB );
            call dispatcher;

Notes:  #MEB's = 2.  One on queue, one in IO.
        Ready^q = MEB(B), Dispatch^q = null, io^q = null;
        MEB(A) in IO.
```

```
27.  proc dispatcher while dispatch^q.q^count do
           @MEB := dequeue( dispatch^q, MEB );
           since ecb.destination = lpsb^id
             call lpsb( MEB );

Note:  #MEB's = 2.  One passed as parameter to LPS, one in IO.
       Ready^q = null, Dispatch^q = null, io^q = null;
       MEB(B) being passed to lpsb;
       MEB(A) in IO.
```

FIG. 18

```
28.   proc lpsb since event = event^disk^io^done
           call lpsb^disk^io^done proc lpsb^disk^io^done
        @lpsb^cb := find^cb( lpsb^id, MEB.session^key );
        --update application data states
          .
          .
          .
        -- Now set up send back to LPSA for user display
        MEB.destination := lpsa^id;
        MEB.origin := lpsb^id;
        MEB.event :=event^data^out;
        call enqueue( dispatch^q, MEB );
        return;

Note:   #MEB's = 2.  One on queue, one in IO.
        Ready^q = null, Dispatch^q = MEB(B), io^q = null;
        MEB(A) in IO.

proc lpsb
        return;
```

```
29.   proc dispatcher while dispatch^q.q^count do
        @MEB := dequeue( dispatch^a, MEB );
        since ecb.destination = lpsa^id
          call lpsa( MEB );

Note:   #MEB's = 2.  One passed as parameter to LPS, one in IO.
        Ready^q = null, Dispatch^q = null, io^q = null;
        MEB(B) being passed to LPSA;
        MEB(A) in IO.
```

FIG. 19

```
30.  proc lpsa
       since event = event^data^out
       call lpsa^data^out;

proc lpsa^data^out
     @lpsa^cb := find^cb( lpsa, meb.session^key );

-- update terminal data transfer states.
       .
       .
       .
       -- save the buffers passed from the query
       @data^out^buffer := @meb.data;
       data^out^count := meb.data^count;
       -- set up terminal I/O
       @meb.data := get^buffer( $len(terminal^io^rec^len) );
       meb.data^count := $len(terminal^io^rec^len);

-- update the terminal buffer
       meb.data ':=' term^hdr^info & data^out^buffer for data^out^count;
       meb.data^count := $len(term^hdr^info) + data^out^count;
       -- do buffer housekeeping on data^out
       .
       .
       .
       -- update meb and send to the I/O Handler for terminal I/O meb.event := event^do^terminal^io;
       meb.origin := lpsa^id;
       meb.destination := -1;   -- This is I/O.  Destination is not an
        LPS.
       call enqueue( io^q, MEB );
       return;

proc lpsa
    return;

proc dispatcher
    return;

Note:  #MEB's = 2.  One one queue, one in IO.
       Ready^q = null, Dispatch^q = null, io^q = MEB(B);
       MEB(A) in IO.

Session context:  No change.
    A=lpsa^cb
    B=lpsb^cb
```

FIG. 20

```
**  ===============================  End of Dispatch Cycle
  31.   proc Scheduler
          since ready^q.q^count = 0
            fall through to:

while io^q.q^count do
          @MEB := dequeue( io^q );
          call do^io( MEB );

proc do^io

-- Internal IO processing here.
          return;

proc Scheduler since io^q.q^count = 0
            fall through to:
          call wait^on^io;

Note:   #MEB's = 2.  All in IO.
        Ready^q = null, Dispatch^q = null, io^q = null
        MEB(A), MEB(B) in IO.

**   ===============================  End of Scheduler Cycle
```

FIG. 21

METHOD AND APPARATUS FOR USE IN PROGRAM OPERATION, CONTROL AND CONTROL BLOCK MANAGEMENT AND STORAGE

This is a continuation application under 37 CFR 1.62 of prior application Ser. No. 07/452,065, filed Dec. 15, 1989, now abandoned.

BACKGROUND OF THE INVENTION

This invention relates to a method and apparatus for use with software programs and, in particular, to a method and apparatus for controlling operation and control block management of these programs.

In computer operating systems in use today, the programs of the systems are often segmented into layers each of which contains a group of self-contained functions or procedures. Each such layer shall be referred to herein as a Layered Procedure Set or LPS.

A basic model governing the communication of messages between and the invoking of LPSs in computer programs is the so-called queued "Scheduler-Dispatcher" model. This model is widely used in the data processing industry, especially in data communications. A particular data communications version of a Scheduler-Dispatcher model is described in Appendix C of IBM's *SNA Format & Protocol Reference: Architectual Logic.*

In the queued Scheduler-Dispatcher functionality, message event blocks (MEBs) are used in conjunction with the Scheduler, Dispatcher and LPSs. MEBs provide an internal storage medium consistent enough in form to be able to pass messages identified as events and their associated control information from place to place within a program, and especially through the Scheduler and Dispatcher and between LPSs.

In one version of the Scheduler-Dispatcher model, the Scheduler functions as a loop within a procedure. The Scheduler loop first waits on interrupts within the system and when an input/output ("I/O") procedure completes, identifies an associated MEB on its ready queue ("READY Q"), dequeues the MEB and enqueues it to the queue of the Dispatcher ("DISPATCH Q") and calls the Dispatcher. The Scheduler also acts on receiving control back from the Dispatcher to check its Ready Q and, if the READY Q contains an MEB, the Scheduler dequeues the MEB from the READY Q and enqueues it to the DISPATCH Q and calls the Dispatcher. If the READY Q is empty, however, the Scheduler checks the queue of the I/O ("I/O Q"). If there is an MEB on the I/O Q, the Scheduler dequeues the MEB and passes it as a parameter for execution of the I/O procedure.

When the Dispatcher is called by the Scheduler, the Dispatcher dequeues an MEB from its DISPATCH Q and calls the LPS associated with the destination contained in the MEB, passing the MEB as a parameter. When control is returned to the dispatcher from the LPS, the Dispatcher checks the DISPATCH Q to determine whether any MEBs are present. If the DISPATCH Q is empty, it returns control to the Scheduler. If the DISPATCH Q is not empty, the Dispatcher repeats its procedure until the DISPATCH Q is empty at which time It then returns control to the Scheduler for repeat of the Scheduler procedure.

In the above operation of the Scheduler-Dispatcher model, the Scheduler, if there are no MEBs in the READY Q, checks the I/O Q to determine whether there are any MEBs present in this queue. If so, the Scheduler dequeues the MEB from the I/O Q to initiate execution of an I/O procedure. This is accomplished by an I/O handler ("I/O Handler") which begins execution upon a call from the Scheduler. This call is accompanied by passing of the MEB. Once the I/O handler has initiated the I/O operation, it returns control immediately to the Scheduler. To complete an I/O, the Scheduler invokes the I/O Handler by a call to the procedure wait on interrupt. The I/O Handler then checks for completion interrupts for the I/O operation (e.g., hitting of a key by a user). If a completion interrupt has occurred, the I/O Handler locates the MEB associated with that I/O, updates the MEB and enqueues it to the READY Q. If a completion interrupt has not occurred, the I/O Handler suspends processing and the process is idle until a completion interrupt actually OCCURS.

The call by the Scheduler to the wait on interrupt procedure is completed when the I/O Handler returns control to the Scheduler. At this point, the Scheduler falls through, i.e., returns to, its READY Q loop procedure. In particular, the Scheduler initiates the LPS portion of its processing cycle by dequeuing the completed and updated MEB from the I/O operation in its READY Q, enqueuing the EMB to the Dispatch Q and then calling the Dispatcher.

The LPS structure and the Scheduler-Dispatcher model with I/O Handler and MEBs is of considerable use in controlling execution and operation and control block management and storage in programs. It is particularly advantageous where the level of complexity of a program is such as to require the utilization of multiple LPSs for the purpose of modularity. It is also advantageous where multiple sessions are to be executed concurrently within the same program. As used herein, a session within a program may be thought of as one or more multi-threaded tasks intended to be completed as a unit. This unit, however, will not be executed continuously from start to finish and the execution of units of several sessions may be occurring concurrently. As an example, the tasks associated with the operation of a single terminal may be considered as a session, while the tasks associated with the operation of multiple terminals may be considered as multiple sessions. A typical example of a program requiring the LPS and Scheduler-Dispatcher structure might be a data communications program (e.g., SNA or OSI) where there are formally architectured functional divisions of labor and where there are many devices (terminals, remote computer systems, disk resources) which are being serviced simultaneously.

While the LPS structure is highly advantageous, the manner of storage and management of the control blocks, both MEBs and layer control blocks ("CBs") which store control and other information associated with the LPSs, permits programming which can have undesired results. A typical data structure for such storage and management of MEBs and CBs is described and shown on page 8 of Appendix A of the aforementioned IBM reference. As shown by the illustrated Node Control Block (equivalent to an MEB), all the CBs are attached directly to the Node Control Block, are rigidly set forth or typed, and all CBs of all the layers (the equivalent of LPSs) are freely available to any other layer.

With this type of storage and management for the CBs, it becomes possible for one LPS to access and alter the content of the CB of another LPS. Such alteration, if it occurs, can have a detrimental effect on program operation, since the second LPS may need its unaltered CB in continuing a procedure. It also inhibits so-called "information hiding", which has been found to be beneficial to program operation and management.

It is, therefore, an object of the present invention to provide a method and apparatus for program control and operation which tends to mitigate the aforesaid disadvantages.

It is a further object of the present invention to provide a method and apparatus for program control in an LPS architectured system which is structured to establish privacy of each CB with respect to its LPS.

It is a further object of the present invention to provide a method and apparatus for program control in an LPS architectured system wherein access of an LPS to a CB of another LPS is inhibited.

It is yet a further object of the present invention to provide a method and apparatus for program control in an LPS architectured system wherein information hiding is promoted.

SUMMARY OF THE INVENTION

In accordance with the principles of the present invention, the above and other objectives are realized by configuring the program and program control of an LPS based system such that the MEBs established in the program for a particular session are associated only with that particular session. The program and control are further configured such that each LPS is allocated only a single CB for a particular session, which CB is only accessible by that LPS and not other LPSs during the session.

In the embodiment of the invention to be disclosed hereinafter, an MEB established for a session carries an identifier (referred to as a SESSION KEY) which uniquely allocates the MEB to the session for which it was established. Similarly the CB of an LPS for a particular session, is associated with the SESSION KEY for that session, as well as with the identifier of the LPS (referred to as "LPSID") for which the CB was established.

In this way, each established MEB is allocated to a particular session and each established CB is allocated to a particular LPS in a particular session. Furthermore, each LPS is constrained to invoke only a SESSION KEY and its LPSID when developing a pointer for a CB. As a result, an LPS is compelled to retrieve only its own CB and access to the CBs of other LPSs is inhibited.

In further aspects of the invention, access to a particular LPS is confined to a single entry point (referred to as the Entry Router) and exit from the LPS to a particular exit point (referred to as the Exit Router) so as to prevent calling of procedures within an LPS directly from outside the LPS. Also the programming and CB storage control and management is such that the storage scheme for the CB of an LPS is unknown to the LPS. In addition, the programming inhibits the LPS from accessing sessions other than that of a current MEB. These requirements along with permitting an LPS to access only its own allocated CB in a session, facilitate the information hiding aspects of the system.

BRIEF DESCRIPTION OF THE DRAWINGS

The above and other features and aspects of the present invention will become more apparent upon reading the following detailed description conjunction with the accompanying drawings, in which

FIGS. 7-21 the program flow corresponding to the operating sequence of FIGS. 5-6.

DETAILED DESCRIPTION

Figure 1:
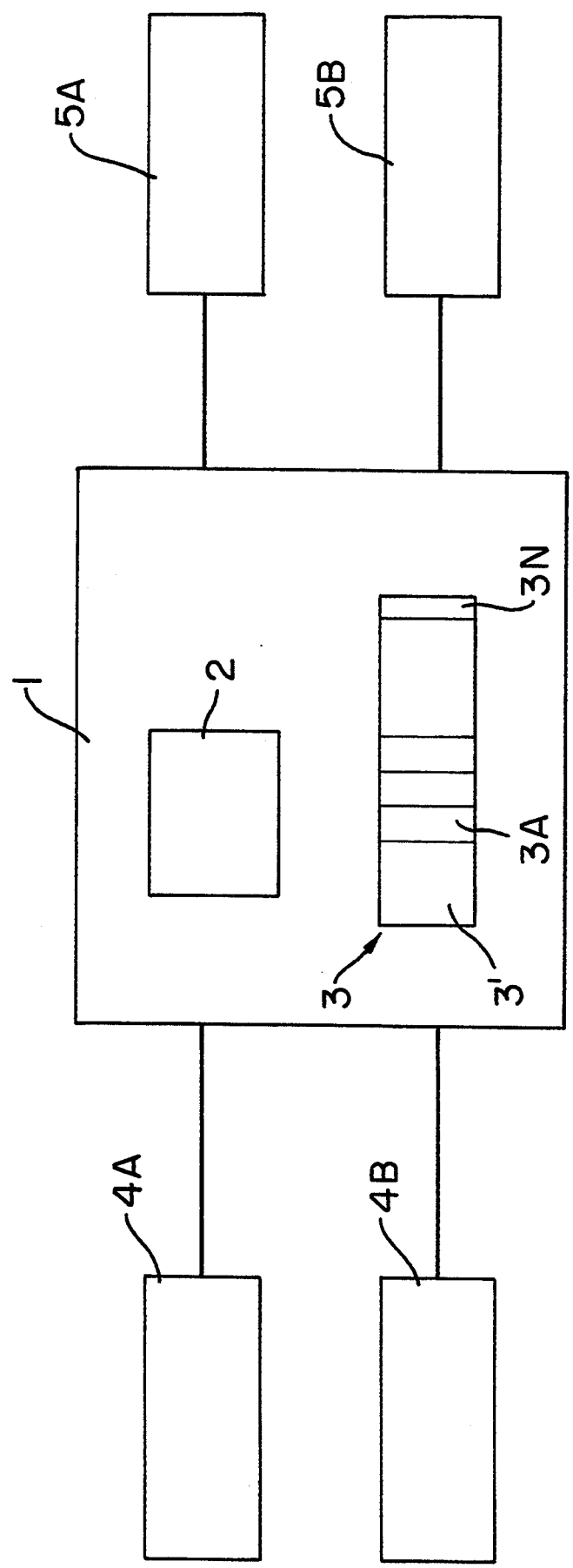
FIG. 1 illustrates a computing apparatus and associated terminals in accordance with the principles of the present invention.

FIG. 1 shows a computing apparatus or system 1 including a program execution and control operating system 2 for executing a program 3 comprised of a plurality of LPSs 3A, 3B ... 3N and a program control means 3' which is described in greater detail hereinabelow. The apparatus 1 is addressed by a plurality of terminals 4A, 4B and communicates with a plurality of storage units or disks 5A, 5B.

The computing apparatus 1 can be any type of computing apparatus with a processing environment similar to that of UNIX and a programming environment like that of C. Such computing apparatus can support the program 3 with LPSs 3A to 3N. For example, the computing apparatus might be an IBM PC with an MS-DOS operating system or a DEC VAX with a VMS operating system, or the environment on which the LPS program originated, Tandem NonStop with Guardian.

The program 3 is a single program instantiated as a single running process. The terms process and program are intended to convey the equivalent of a UNIX program and process. In the present illustrative case, the program 3 is complex enough to be divided into functionally discrete groupings of functions or procedures which are multi-threaded in nature (i.e., several actions can be taken place concurrently).

Figure 4:
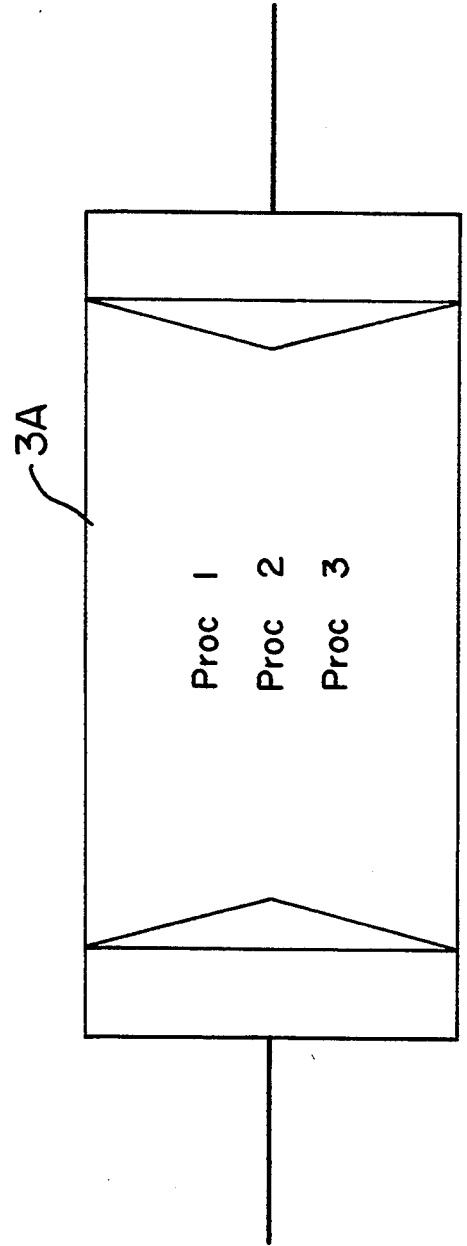
FIG. 4 shows in greater detail an LPS used in the system of FIG. 1.

As above-indicated, each LPS 3A to 3N is an entirely self contained group of functions or procedures. Furthermore, in accordance with the invention, entry into and exit from each LPS 3A to 3N is through a single procedure. These attributes for each of the LPSs 3A to 3N are illustrated for the LPS 3A in FIG. 4. As shown, the LPS 3A contains procedures Proc 1 to Proc 3 and entry into the LPS 3A is through a single procedure, called only by the Dispatcher (described below), identified as Entrance Router; and exit is also through a single procedure, and identified as the Exit Router. By exit is meant the issuance of MEBs to other LPSs or the I/O Handler (described below). More particularly, a procedure in LPS 3A is indirectly invoked as a function of the input handling performed by the Entrance Router for that LPS. A procedure within an LPS 3A, on the other hand, cannot generate output, except by invoking the Exit Router for that LPS.

Figure 2:
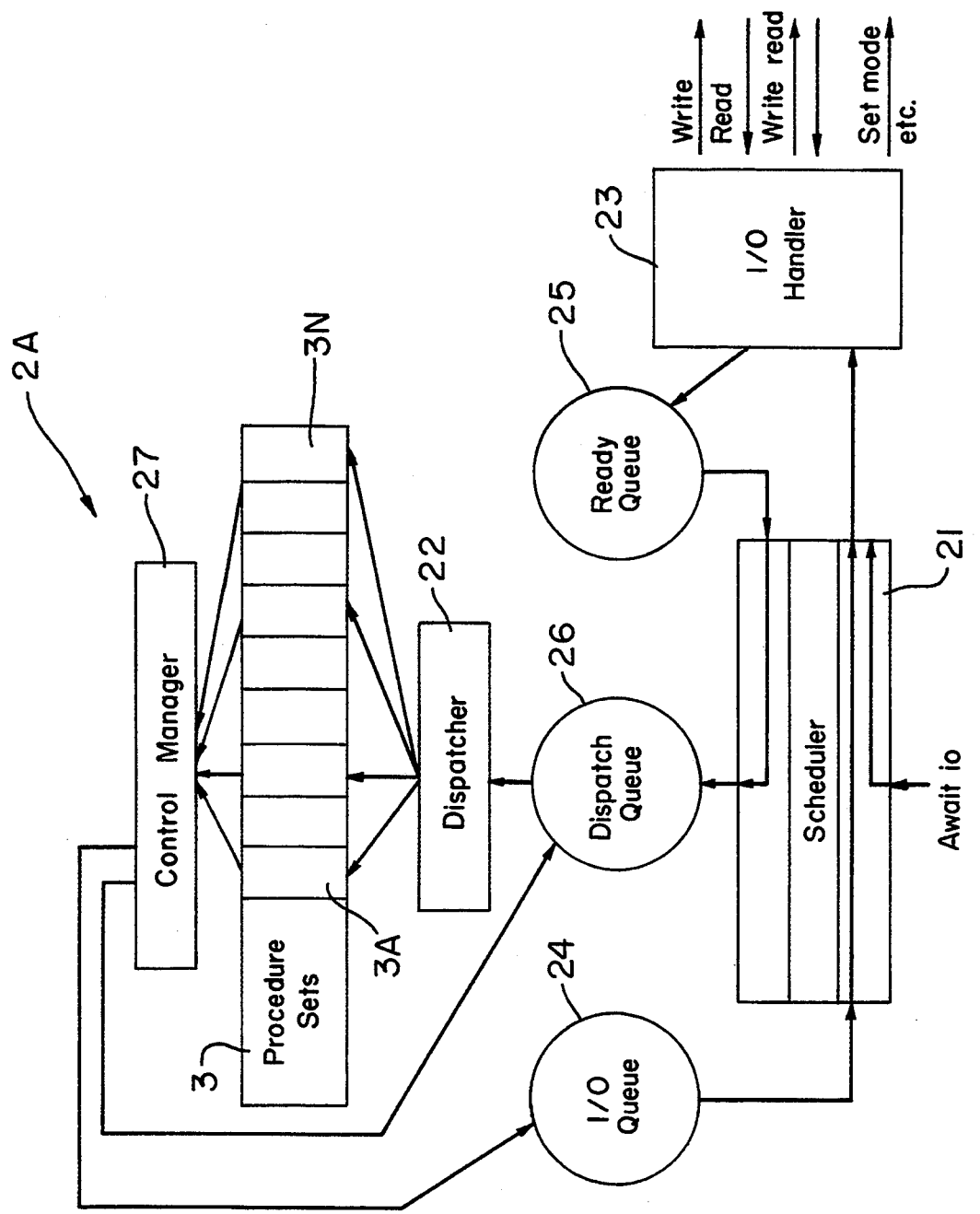
FIG. 2 shows the details of a portion of the program execution and control system of the apparatus of FIG. 1.

FIG. 2 shows the program control means 3' which supports control of inputs and outputs in and to the program 3 and, in particular, in, to and between the LPSs 3A to 3N. This program control means 3' of the program 3 is in the form of the Scheduler-Dispatcher model and I/O Handler discussed above. Thus, as shown, in FIG. 2, the execution section 2A comprises a Scheduler 21, Dispatcher 22, I/O Handler 23, I/O Q 24, READY Q 25 and DISPATCH Q. These elements function as previously described above for the Scheduler-Dispatcher model in interacting with the LPSs 3A to 3N within the program 3. The program control means 3' also includes a Control Manager 27 which acts also as a secondary scheduler for the output MEBS from the LPSs 3A to 3N routing them to the I/O Q and the DISPATCH Q as determined by the outputs.

Figure 3:
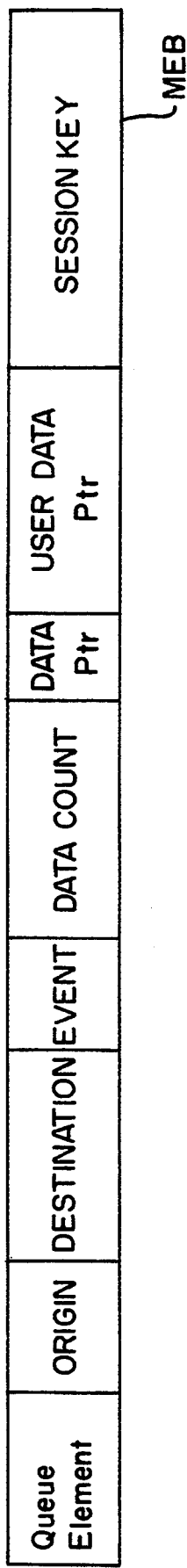
FIG. 3 shows the structure of an MEB used in the program execution and control system of FIG. 2.

FIG. 3 shows the structure of an MEB utilized in the program 3 and program control means 3' for conveying messages. As shown, the MEB includes usual fields marked ELEMENT, ORIGIN, DESTINATION, EVENT, DATA COUNT, DATA, and USER DATA. Of these, the fields DESTINATION and ORIGIN provide information as to the next element to be receiving the MEB (DESTINATION) and the element which last received the MEB and its associated message (ORIGIN). In the case of messages to and from an LPS, these fields would contain the identifier LPSID of the particular LPS. ELEMENT refers to any LPS or the I/O Handler. The fields DATA and DATA COUNT are pointers to a message buffer and the size of the buffer respectively. The field EVENT designates the event to be invoked by the MEB.

In accordance with the principles of the present invention, the MEB is adapted to include a further field which specifically identifies the MEB with a particular session of the program 3. In the case shown, this field is identified as Session Key. The Session Key ties the MEB to a particular session. Recognizing the need for passing information between LPSs (normally accomplished by direct access of CBs by LPSs), a USER DATA pointer field is provided for the MEB and is constrained to contain only data specifically required for inter LPS communication. More general data concerning each LPS is thus not available from this field, thereby promoting hiding of the LPS data.

An MEB is generated by the program 3 upon the establishment of each new session. The MEB is created by a procedure or function within the program 3 by calling the procedure CREATE MEB. The called procedure responds by creating an MEB having a SESSION KEY or pointer which identifies the session uniquely and the place in memory allocated to the session. The allocated memory location can then be accessed for later use by LPSs invoking specific procedures detailed hereinbelow passing the Session Key as a parameter.

The creation of an MEB may likely be performed upon initialization of the program 3, as by one of the terminals 4A, 4B being brought into operation. Each initialization of a different terminal amounts to a new session and each new session establishes another MEB with a Session Key allocated to that session.

Once an MEB with a Session Key has been established for a session, the LPSs 3A to 3N can duplicate the created MEB by calling the procedure CLONE MEB. This procedure creates a new MEB based on the original MEB passed with the call and the new MEB has the same SESSION KEY and identifier as the original MEB. Also, each LPS can destroy an existing MEB allocated to a session by calling the procedure PUT MEB. If the MEB is the only one allocated to the session, the session as well as the MEB will be terminated.

As above-indicated, each of the LPSs is identified with an identifier LPSID which identifies it uniquely among the LPSs within a single program. In further accordance with the invention, the program 3 and control means 3' are such that each LPS is further allocated only a single CB and corresponding memory storage area for each program session. The CB is established by the LPS calling the procedure ALLOCATE CB which then allocates a CB using the LPSID of the LPS and the MEB SESSION KEY as unique identifiers. In allocating a CB, the length of the CB is determined by the LPS in the ALLOCATE CB instruction to insure complete flexibility in the CB format.

The program 3 and control means 3' are also such that storage of an allocated CB of an LPS is unknown to the LPS until retrieval of a CB which can only be achieved by the LPS calling FIND CB with the LPSID and SESSION KEY. Likewise, a CB of an LPS can be removed from a session by calling DEALLOCATE CB again using only the combination of LPSID and SESSION KEY. Illustrative Examples, of procedures for CREATE MEB, CLONE MB, PUT MEB, ALLOCATE CB, FIND CB and DEALLOCATE CB are set forth in the attached Appendix I, pages A14–20, which is made a part hereof.

By requiring that a LPS only have access to a CB in a session by calling its LPSID and the SESSION KEY, an LPS is given access only to its own CB. Thus, access to and altering of another LPS's CB is prevented. Furthermore, the programming 3 and control means 3' are such that each LPS can only access the session of the current MEB. These atributes of the LPSs foster information hiding in the program 3.

Figure 5:
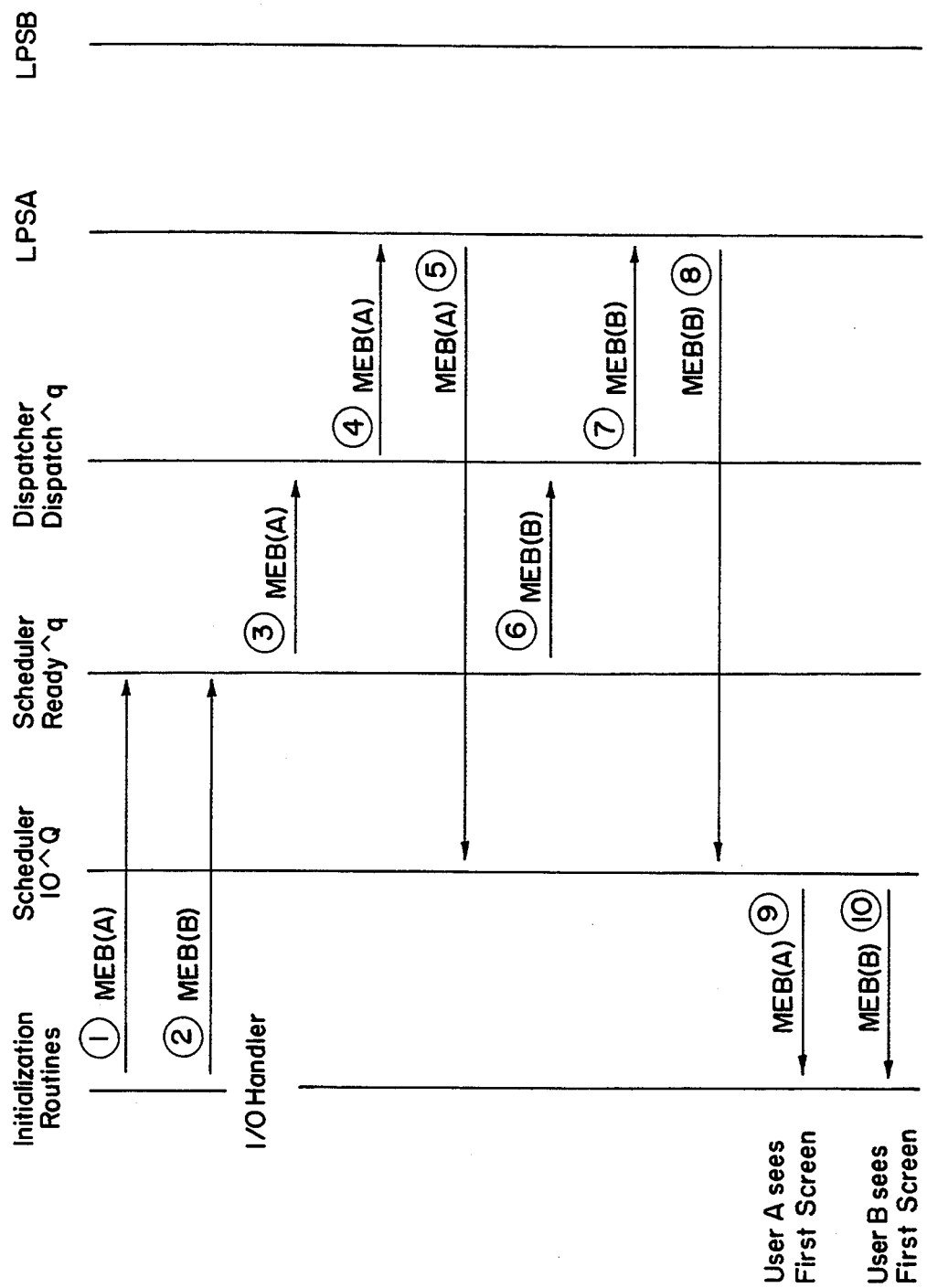
FIGS. 5-7 show diagrammatically an example of the sequence of operation of the program of the apparatus of FIG. 1.
Figure 6:
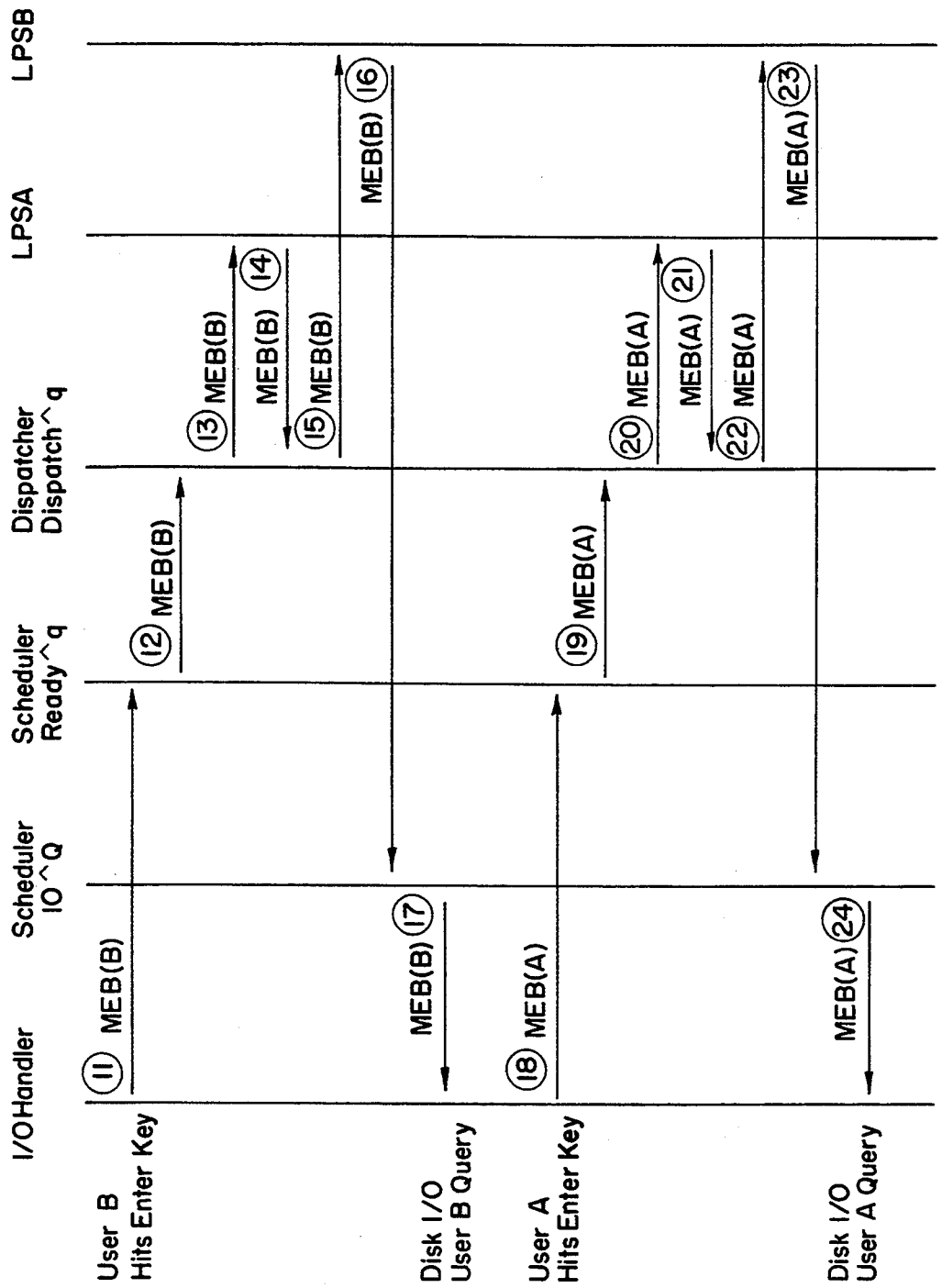
Figure 7:
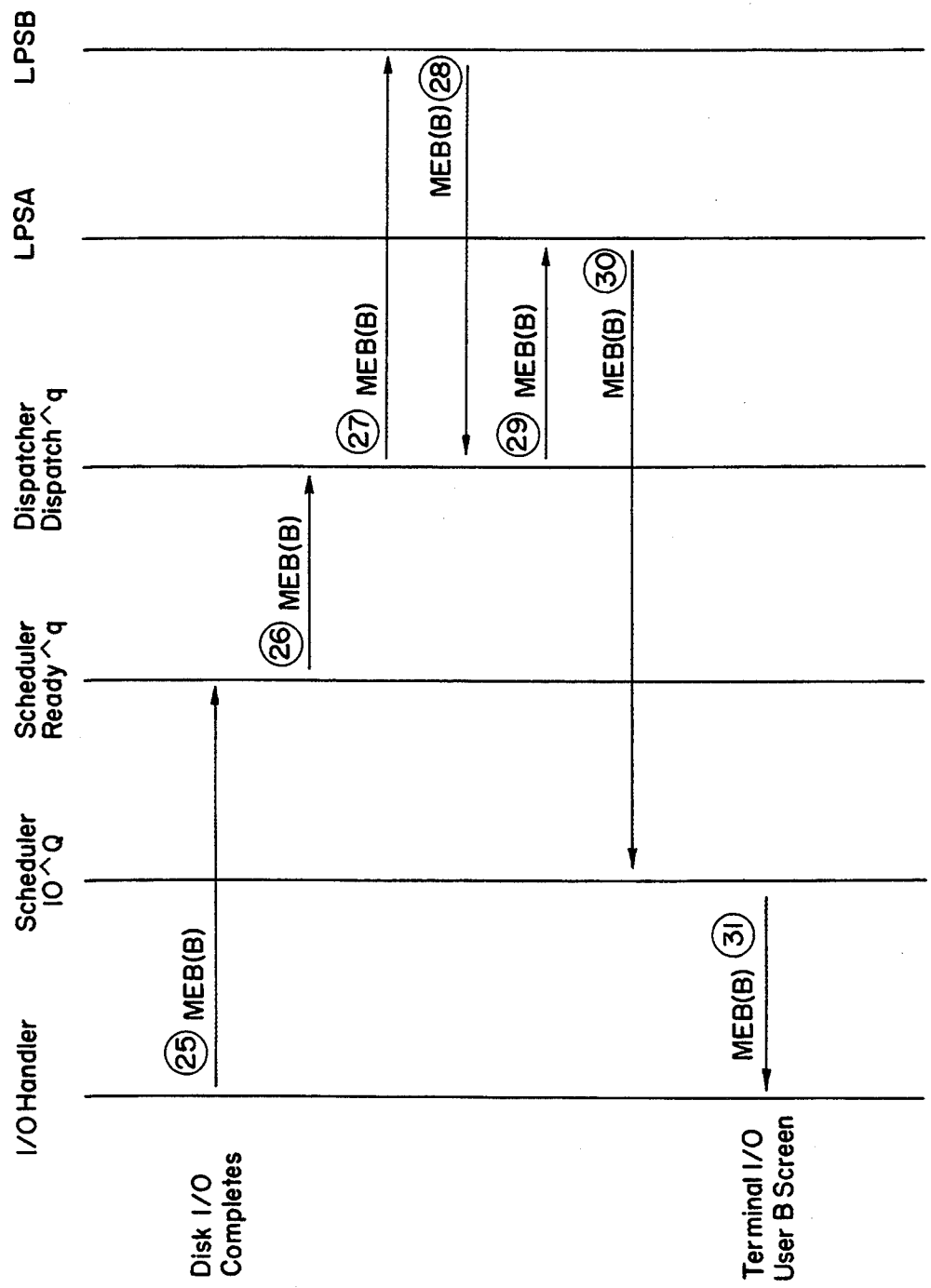

FIGS. 5–7 show diagrammatically an example of the sequence of operation of the system 1 during initialization of the terminals 4A, 4B and during subsequent entry of inputs at the terminals, respectively. FIGS. 7–21 illustrate the program flow corresponding to the operating sequences of FIGS. 5–7. An example of a short program for performing the sequence of operation in FIGS. 5–7 is set forth in the aforementioned Appendix I, at pages A1–A13, with the steps in FIGS. 5–7 being indicated on the corresponding program parts.

In the operating sequence of the above figures, it is assumed that both terminals 4A and 4B turn on requiring two sessions designated A and B which will operate concurrently. It is further assumed that during these sessions both terminals will specify events requiring procedures of LPSs 3A and 3B.

Prior to initialization, the READY Q, DISPATCH Q and I/O Q are empty and there are no MEBs present. Upon initialization of the terminals 4A and 4B, program 3 invokes sequence steps 1 and 2 in which the program creates a first MEB(A) associated with the session A of the terminal 4A and a second MEB(B) associated with the session B of the terminal 4B. These MEBs are placed on the READY Q for processing by the Scheduler at step 3.

The Scheduler dequeues the MEB(A) from the READY Q to the DISPATCH Q and calls the Dispatcher. At step 4, the Dispatcher dequeues the MEB(A) to the LPS 3A identified by the LPSID in the DESTINATION block of the MEB. In step 5, the LPS 3A processes the MEB(A) in accordance with the EVENT block which indicates initialization. LPS 3A thereupon allocates a CB to itself and identifies the CB with the MEB(A) SESSION KEY and with the LPSID of LPS 3A. The MEB(A) through the program manager is then placed on the I/O Q. That completes the Dispatch cycle for the MEB(A) and control returns to the Scheduler.

In steps 6, 7, 8 and the steps 3, 4 and 5 are repeated for the MEB (B), resulting in a second CB for the LPS 3A being established for the session B, which CB is uniquely identified by the MEB<B) session Key and the LPSID of LPS 3A. Step 8 completes the second Dispatch cycle and both MEB(A) and MEB(B) are on the I/O Q.

In step 9, the Scheduler finds no MEBs in its READY Q and thus falls through to the I/O Q which now contains MEB(A) and MEB(B). The Scheduler dequeues MEB(A) and calls for an I/O. The Scheduler then in step 10 again continues its loop on the I/0 Q, dequeues MEB(B) and calls for an I/O.

In step 11, the Scheduler then waits for a completion interrupt for an I/O procedure. In the present case, it is assumed that the I/O for terminal 4B associated with the session B and MEB(B) completes first (e.g. user on terminal 4B hits enter key) causing a completion interrupt. The I/O Handler then places the MEB(B) on the READY Q with its DESTINATION set at its previous ORIGIN, i.e., LPS 3A and returns control to Scheduler. The MEB(A) is still in the I/O, since no completion interrupt for this MEB has occurred. In step 12 the Scheduler loops back to check the READY Q dequeues MEB(B) from the READY Q, enqueues it on the DISPATCH Q and calls the Dispatcher.

In step 13, the DISPATCHER dequeues the DISPATCH Q, passing the MEB(B) to the LPS 3A, its DESTINATION. At this point, the MEB(A) still remains in the I/O. At step 14, the LPS 3A, recognizes from the EVENT of MEB(B) that the I/O for MEB(B) has been completed. It then calls its CB for the Session B, using the MEB(B) SESSION KEY and LPSID. After updating, the LPS 3A procedure continues, whereupon it is assumed that a query regarding the session B has been made to LPS 3A by the user. The LPS 3A thus changes the DESTINATION for the MEB(B) to LPS 3B and its event to data in to satisfy the query. The MEB(B) is then placed on the DISPATCH Q, while the MEB(A) still remains in the I/O.

In step 15, the Dispatcher dequeues the DISPATCH Q passing the MEB(B) to the LPS 3B by calling this LPS. At step 16, the LPS 3B, recognizing this as a new session, establishes a CB for the new session B by calling the procedure ALLOCATE CB. The CB is then allocated using the MEB(B) SESSION KEY and the LPSID as identifiers. The LPS 3B then updates and its procedure continues, whereupon it calls for a disk I/O. The MEB(B) is then placed on the I/O Q with its EVENT changed to do disk The MEB(A) still remains in the I/O. Since there are no MEBs on the DISPATCH Q, this ends the dispatcher cycle.

Return of control is thus made to the Scheduler in step 17. The Scheduler, finding nothing in its READY Q, then falls through to the I/O Q. The Scheduler finds MEB(B) in the I/O Q and dequeues MEB(B) calling for an I/O at step 17. At this point, internal processing is carried out, the I/O Handler returns control to the Scheduler, and the Scheduler waits for a completion interrupt for an I/O by calling the procedure wait on io interrupt, since both MEB(A) and MEB(B) are in I/O.

In step 18, the I/O for MEB(A) completes. The MEB(A) is placed by the I/O Handler on the READY Q with its DESTINATION LPS 3A and its EVENT changed to io done. Control is returned to the Scheduler. The Scheduler then calls the Dispatcher after the MEB(A) is dequeued from the READY Q and enqueued to the DISPATCH Q, while the MEB(B) remains in the I/O. In step 19, the Dispatcher dequeues the DISPATCH Q passing the MEB(A) to LPS 3A, the MEB(B) still remaining in the I/O. In step 20,the LPS 3A recognizes that the I/O has been completed and calls its CB for the session A with the MEB(A) SESSION KEY and LPSID. The Session A CB is updated and the procedure continues, whereupon the MEB(A) is also set for a data query by LPS 3B. Thus, the MEB(A) DESTINATION is set to LPS 3B and the EVENT to data in. The MEB(A) placed on the DISPATCH Q with MEB(B) remaining in the I/O and LPS 3A returns control to the DISPATCHER.

In step 21, the Dispatcher dequeues the MEB(A)A and calls the LPS 3B. In step 22, the LPS 3B recognizing this is another session, i.e., Session A, allocates a CB to this session using the procedure ALLOCATE CB. A CB for the LPS 3B is thus allocated to the Session A by identifying the CB with with the MEB(A) Session Key and the LPSID. The LPS 3B then updates the allocated CB and continues to a disk I/O procedure. At this point, the MEB(A) is enqueued to the I/O Q with its event changed to do disk io. LPS 3B returns control to the DISPATCHER. This completes the Dispatch cycle which returns control to the Scheduler.

At step 23, the scheduler checks the READY Q, finding it empty drops through to the I/O Q and calls for an I/O for the MEB(A) in the Q. At step 24, the procedure then returns after internal processing, and the Scheduler waits for a completion interrupt for the I/O of either the MEB(A) and MEB(B).

In step 25, the Scheduler waits for a completion interrupt by calling the procedure wait on io. In this case, the disk I/O for the query for terminal 4b associated with the session B and MEB(B) completes, causing a completion interrupt. The I/O Handler then places the MEB(B) on the READY Q with its destination set at its previous ORIGIN, i.e., LPS 3A and returns control to the Scheduler. The MEB(A) is still in the I/O, since no completion interupt for this MEB for disk I/O has occurred. In step 26, the Scheduler loops back to check the READY Q, dequeues MEB(B) from the READY Q, enqueues it on the DISPATCH Q and calls the Dispatcher.

In step 27, the DISPATCHER dequeues the DISPATCH Q, passing the MEB(B) to the LPS 3B, its DESTINATION. At this point, the MEB(A) remains in the I/O. At step 28, the LPS 3B recognizes from the EVENT disk io done of MEB(B) that the I/O for MEB(B) has been completed. It then calls its CB for the Session B, using the MEB(B) SESSION KEY and LPSID. After updating, the LPS 3B procedure continues, whereupon it is assumed that the data from the completed I/O on Session B has to be forwarded to LPS 3A. The LPS 3B thus changes the DESTINATION for the MEB(B) to LPS 3A, the ORIGIN for the MEB(B) to LPS 3B, and its EVENT to data out. The MEB(B) is then placed on the DISPATCH Q, while the MEB(A) still remains in the I/O. Control is returned to the Dispatcher.

In step 29, the DISPATCHER dequeues the DISPATCH Q, passing the MEB(B) to the LPS 3A, its DESTINATION. MEB(A) remains in the I/O. At step 30, the LPS 3A recognizes from the EVENT data out of MEB(B) that the data carried on this MEB must be formatted for terminal I/O to terminal 4B associated with session B and MEB(B). After updating, the LPS 3A procedure continues, whereupon it prepares the MEB(B) for terminal I/O. The LPS 3A thus changes the DESTINATION to an insignificant value, the ORIGIN for the MEB(B) to LPS 3B, and its EVENT to do terminal io. The MEB(B) is then placed on the DISPATCH Q, while the MEB(A) still remains in the I/O. Control is returned to the Dispatcher. The Dispatcher, finding no MEBs on the DISPATCH Q, returns control to the Scheduler.

In step 31, the Scheduler, finding no MEB on its READY Q, then falls through to the loop on the I/O Q. The Scheduler finds the MEB(B) in the I/O Q, dequeues the MEB(B) from the I/O Q, and invokes the I/O Handler by passing the MEB(B) as a parameter to the procedure do io. At this point, internal processing is carried out, and the I/O Handler returns control to the Scheduler. The Scheduler, finding no MEBs on the I/O Q, waits for an interrupt completion by calling wait on interrupt. Both MEB(A) and MEB(B) are in I/O. MEB(A) is still held by the I/O Handler for disk I/O, and MEB(B) is held by the I/O Handler for terminal I/O.

In foregoing the illustrative example, it is apparent that the program 3 and control 3' allocate the MEB's on a session basis, two sessions being illustrated in the example. It is also apparent that the program 3 and control 3' cause the LPSs to allocate and have access to one CB per session and that access to the respective CB is through the SESSION KEY and the LPSID. These attributes of the system 1, as above-discussed, promote information hiding and enhanced performance.

It should be noted that in the system 1, the CBs of the LPSs are not intended to be used to transfer information from one LPS to another, but rather to establish an environment for an LPS within a session. The CBs can be thought of as answering for their respective LPSs the questions "Where Was I When I issued the I/O or other request".

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention.

```
-- file lpsa: LPSA private globals and procedures

-- In this example, LPSA is a terminal handling LPS.  Its primary concern is
-- transferring data to and from terminals, and performing terminal oriented
-- data communications tasks.

struct lpsa^cb^def( * );   -- template definition
begin
   struct cb^hdr( control^block^hdr^def );
   struct lpsa^cb^elements;
   begin
      -- Most of the elements of this control block will not be
      -- used in this example.  They are here to illustrate typical
      -- elements of concern to one LPS, but not to others.
      --
      int terminal^fn;   -- terminal filenumber
      int terminal^state;
      literal term^state^read^pending   = 1;
      literal term^state^not^ready      = 2;
      literal term^state^ready          = 3;
      literal term^state^more^data^write = 4;
      int terminal^type;
      int .message;
      int segment^count;
      int current^segment^offset;
   end;
end;

-- file lpsb: LPSB private globals and procedures

-- In this example, LPSB is a disk handling LPS.  Its primary concern is
-- transferring data to and from disks, and user interface functions.
-- struct lpsb^cb^def( * );   -- template definition
begin
   struct cb^hdr( control^block^hdr^def );
   struct lpsb^cb^elements;
   begin
      -- Most of the elements of this control block will not be
      -- used in this example.  They are here to illustrate typical
      -- elements of concern to one LPS, but not to others.
      --
```

```
      int disk^fn;         -- terminal filenumber
      int application^state;
      literal appl^state^disk^io^pending = 1;
      literal appl^state^waiting^on^user = 2;
      literal appl^state^session^time^exp = 3;
    end;
end;

-- file pubgbl: public globals

-- procedure set routing globals
literal lpsa^id       = 1;
literal lpsb^id       = 2;
literal lpsc^id       = 3;
literal io^handler^id = 4;

literal event^do^terminal^io   = 1;
literal event^terminal^io^done = 2;
literal event^do^disc^io       = 3;
literal event^disc^io^done     = 4;
literal data^in                = 5;
literal data^out               = 6;

-- global queues
struct io^q( q^head^def );
struct dispatch^q( q^head^def );
struct ready^q( q^head^def );

--
struct control^block^hdr^def(*);
begin
  .
  .
  .
end;

struct meb(*);
begin
  struct element( q^element^def );
  int origin;
  int destination;
  int session^key;
  int .data;   -- general data buffer pointer. Used for I/O.
  int data^count;
  int .user^data;  -- Inter-LPS buffer pointer
end;
proc lpsa^term^init( meb );
  int .meb( meb^def );
begin
  int .lpsa^cb( lpsa^cb^def );

-- This procedure is called once after initialization to establish
  -- the session control block lpsa^cb for the session associated with
  -- the passed meb.

@lpsa^cb := allocate^cb( lpsa^id, meb.session^key, $len(lpsa^cb^def) );

-- Terminal^id for I/O is the terminal^fn established at initialization.
  -- Store it in the control block for later use and get rid of the
  -- user data buffer, which is no longer useful.

lpsa^cb.terminal^fn := meb.user^data;
  call put^buffer( meb.user^data );

-- Perform the rest of the initialization housekeeping for the control block
  .
  .
  .

-- Set up the first terminal I/O
  @meb.data := get^buffer( $len(terminal^io^rec^len) );
  meb.data^count := $len(terminal^io^rec^len);
```

```
   meb.event := event^do^terminal^io;
   meb.origin := lpsa^id;
   meb.destination := -1;  -- This is I/O. Destination is not an LPS.

call enqueue( io^q, meb );

end; -- proc lpsa^term^init proc lpsa^terminal^io^done( meb );
   int .meb( meb^def );
begin int .lpsa^cb( lpsa^cb^def );

@lpsa^cb := find^cb( lpsa, meb.session^key );

-- update terminal data transfer states.
   .
   .
   .
   -- set up data query
   meb.destination := lpsb^id;
   meb.origin := lpsa^id;
   meb.event := event^data^in;

call enqueue( dispatch^q, meb );

end; -- proc lpsa^terminal^io^done
proc lpsa^data^out( meb );
   int .meb( meb^def );
begin int .data^out^buffer;
   int  data^out^count;
   int .lpsa^cb( lpsa^cb^def );

@lpsa^cb := find^cb( lpsa, meb.session^key );

-- update terminal data transfer states.
   .
   .
   .
   -- save the buffers passed from the query
   @data^out^buffer := @meb.data;
   data^out^count := meb.data^count;
   -- set up terminal I/O
   @meb.data := get^buffer( $len(terminal^io^rec^len) );
   meb.data^count := $len(terminal^io^rec^len);

-- update the terminal buffer
   meb.data ':=' term^hdr^info & data^out^buffer for data^out^count;
   meb.data^count := $len(term^hdr^info) + data^out^count;
   -- do buffer housekeeping on data^out
   .
   .
   .

-- update meb and send to the I/O Handler for terminal I/O meb.event := event^do^terminal^io;
   meb.origin := lpsa^id;
   meb.destination := -1;  -- This is I/O. Destination is not an LPS.
   call enqueue( dispatch^q, meb );

end; -- proc lpsa^data^out proc lpsa( meb );
   int .meb( meb^def );
begin case meb.event of
      begin
```

```
        event^term^init ->
          -- sent at initialization.  one for each terminal
          call lpsa^term^init( meb );
        event^terminal^io^done ->
          -- data coming from the IO Handler directly from the terminal user
          call lpsa^terminal^io^done( meb );
        event^send^data ->
          call lpsa^send^data( meb );
        otherwise ->
          call abend;
      end; -- case end; -- proc lpsa
proc lpsb^data^in( meb );
   int .meb( meb^def );
begin int .lpsb^cb( lpsb^cb^def );

@lpsb^cb := find^cb( lpsb, meb.session^key );
   if @lpsb^cb <= 0 then
      -- This must be a new session... Time to allocate a fresh CB
      @lps^cb := allocate^cb( lpsb^id, meb.session^key, $len(lpsb^cb^def) );

-- update application data states.
   .
   .
   .
   -- set up disk IO
   meb.destination := -1;  -- io handler.  doesn't matter
   meb.origin := lpsb^id;
   meb.event := event^do^disk^io;

call enqueue( io^q, meb );

return;

end; -- lpsb^data^in proc lpsb^disk^io^done( meb );
   int .meb( meb^def );
begin int .lpsb^cb( lps^cb^def );

@lpsb^cb := find^cb( lpsb, meb.session^key );

-- update application data states.
   .
   .
   .
   -- set up disk IO
   meb.destination := lpsa^id;
   meb.origin := lpsb^id;
   meb.event := event^data^out;

call enqueue( dispatch^q, meb );

end; -- lpsb^data^in proc lpsb( meb );
   int .meb( meb^def );
begin case meb.event of
     begin
        event^data^in ->
          call lpsb^data^in( meb );
        event^disk^io^done ->
          call lpsb^disk^io^done( meb );
```

```
            otherwise ->
                call abend;
        end;

end; -- proc lpsb
-- file sched: scheduler and dispatcher

-- source in the public globals
?source pubgbl proc dispatcher;
begin
    while dispatch^q.q^count do
    begin
        @meb := dequeue( dispatch^q );
        case meb.destination do
            lpsa^id ->
                call lpsa( meb );
            lpsb^id ->
                call lpsb( meb );
            lpsc^id ->
                call lpsc( meb );
    end;
end; -- proc dispatcher proc scheduler;
while 1 do
begin while ready^q.q^count do
    begin
        @meb := dequeue( ready^q );
        call enqueue( dispatch^q );
        call dispatcher;
    end;

while io^q.q^count do
    begin
        @meb := dequeue( io^q );
        call do^io( meb );
    end;

call wait^on^interrupt;

end; -- proc scheduler proc example main;
begin int .meb( meb^def );

int config^fn;
    int terminal^fn;
    int error;
    int config^file^name[0:11] := ["$data    data    config  "];
    struct config^rec;
    begin
        int terminal^name[0:11];
    end;
    int count^read;

literal read^count = 80;
    literal end^of^file = 1;

call open ( config^file^name, config^fn );
```

```
error := 0;
while not error do
begin
  call read( fn, config^rec, read^count, count^read );
  if <> then
    begin
      call fileinfo( fn, error );
    end
  else
    begin
      call open( config^rec.terminal^name, terminal^fn );
      if = then
        begin
          @meb := create^meb;
          meb.destination := lpsa^id;
          meb.origin := -1;
          meb.event := event^term^init;
          @meb.user^data := get^buffer( $len(terminal^fn) );
          meb.user^data := terminal^fn;

call enqueue( ready^q, meb );
        end
      else
        call abend;
    end;
end;

call scheduler;

end; -- proc example

?page "c r e a t e ^ m e b"
-- ================================================================= --
--                                                                   --
-- The create^meb procedure will dynamically allocate an meb from the --
-- memory pool.  It will also dynamically allocate a session^q and use --
-- the address returned as the session^key.  In this implementation,  --
-- session^q and session^key are synonomous.                         --
-- ================================================================= --
--                                                                   --
-- @meb := create^meb;                                               --
--                                                                   --
-- @meb                                                              --
--                                                                   --
--    int(32) : ref : returned address                               --
--                                                                   --
--    is the address of the block of the allocated meb. Address will be --
--    null if operation fails.                                       --
--                                                                   --
-- ================================================================= -- int(32) proc create^meb;
  int      filenumber;
  int .ext rcb( rcb^def );
begin int .ext meb( meb^def );
  int      status;

define failure^ =
    begin
      call put^buffer( meb );
      return -1d;
    end#;

-- allocate the memory
  if (@meb := get^buffer( $len (meb^def), lib^filler)) <= 0d then
    return -1d;

-- create a session^q
  if (@session^q := get^buffer($len(session^q^def), lib^filler)) <= 0d then
    return false;
```

```
   -- set anchor^count
   session^q.anchor^count := 1;

-- link meb to session^q
   meb.session^key := @session^q;

-- return address
   return @meb;

end; -- create^meb
?page "c l o n e ^ m e b"
-- ================================================================ --
--                                                                  --
-- The clone meb procedure will allocate and initialize an meb to be a --
-- duplicate of the meb passed as a parameter.                      --
--                                                                  --
-- ================================================================ --
--                                                                  --
-- @meb := clone^meb( meb );                                (i)     --
--                                                                  --
-- @meb                                                             --
--                                                                  --
--    int(32) : ref : returned address                              --
--                                                                  --
--    is the returned address of the allocated meb. The address will be --
--    null if the operation fails.                                  --
--                                                                  --
-- meb                                                              --
--                                                                  --
--    int(32) : ref : *                                             --
--                                                                  --
--    is the address of the meb to clone.                           --
--                                                                  --
-- ================================================================ -- int(32) proc clone^meb( meb );
    int .ext meb( meb^def );
  begin int .ext new^meb( meb^def );
    int .ext session^q( session^q^def );

-- check for bad address
    if (@meb <= 0d) then
      return -1d;

-- allocate the meb
    if (@new^meb := get^buffer($len(meb^def), lib^filler)) <= 0d then
      return -1d;

-- initialize the meb
    new^meb ':=' meb for ($len(meb^def) + 1) / 2;
    @new^meb.data := 0d;
    new^meb.session^key := meb.session^key;

-- increment the session^q anchor count
    @session^q := new^meb.session^key;
    session^q.anchor^count := session^q.anchor^count + 1;

-- return address of meb
    return @new^meb;

end; -- clone^meb
?page "p u t ^ m e b"
-- ================================================================ --
--                                                                  --
-- The put^meb procedure will deallocate an meb and return it to the the --
-- memory pool. It will also deallocate the session^q if necessary. --
--                                                                  --
-- ================================================================ --
```

```
-- call put^meb( meb );                                         (i)

-- meb

--     int(32) : ref : *

--     is the meb to deallocate.

-- ================================================================ proc put^meb( meb );
      int .ext meb( meb^def );
   begin int .ext session^q( session^q^def );
      int .ext fcb( fcb^def );

-- check for bad address
      if (@meb <= 0d) then
        return;

-- find session^q;
      @session^q := meb.session^key;

-- decrement anchor count
      session^q.anchor^count := session^q.anchor^count - 1;

-- deallocate the data buffer
      if (@meb.data > 0d) then
        call put^buffer(meb.data);

-- deallocate the user^data
      if (@meb.user^data > 0d) then
        call put^buffer(meb.user^data);

if session^q.anchor^count <= 0 then

-- deallocate sesssion^q
         begin if session^q.q^head.current^size > 0 then
               -- the last meb shouldn't be put with anything left
               -- on the session^q.
               call fatal^error^shutdown( prog^fatal^err );

-- deallocate session queue
            call put^buffer( session^q );
         end;

-- deallocate meb
      call put^buffer( meb );
end; -- put^meb

?page "a l l o c a t e ^ c b"
-- ================================================================
--
-- The allocate^cb routine will get a block of memory of length specified
-- by the caller. If a fill value is passed, that will be the block
-- initialization value, otherwise the default (null) will be used. The
-- caller must pass the session^key and the lpsid to enable the
-- procedure to automatically add the control block to the session^q.
--
-- ================================================================
--
-- @cb := allocate^cb( lpsid                                  (i)
--                   , session^key                            (i)
--                   , byte^length );                         (i)
--
-- @cb
--
--     int(32) : ref : returned address
--
```

```
--    is the returned address of the control block. The address will be
--    null if allocation fails.
--
-- session^key
--
--    int(32) : ref : *
--
--    is the address of the session^q for auto link to session thread.
--
-- lpsid
--
--    int : value
--
--    is the unique identifier for the calling layer procedure set.
--
-- byte^length
--
--    int : value
--
--    is the byte length for the control block allocation.
--
-- ====================================================================== int(32) proc allocate^cb( lpsid, session^q, byte^length );
     int       lpsid;
     int .ext session^q( session^q^def ); -- actually the meb.session^key
     int       byte^length;
     int       filler;
   begin int .ext q^element( q^element^def );
     int .ext cb( q^element^def );
     int use^fill;
     int status;

-- allocate the memory
     if (@cb := get^buffer( byte^length, lib^filler )) <= 0d then
      return -1d;

-- move lpsid into the element id
     cb.q^element.element^id := lpsid;

-- check to see if previously enqueued
     if (@ptr := find^cb(session^q, lpsid)) > 0d then
       return -1d;

-- enqueue the cb
     call enqueue( session^q, q^element );

-- return address
     return @cb;

end; -- allocate^cb
?page "f i n d ^ c b"
```

-- ======================================================================
--
-- The find^cb procedure will allow a layer procedure set to retrieve a
-- control block from the session queue.
--
-- ======================================================================
--
-- @cb := find^cb( lpsid                                          (1)
--              , meb.session^key );                              (i)
--
-- @cb
--
--    int(32) : ref : returned address
--
--    is the address of the layer procedure set control block.
--
-- lpsid
--
--    int : value

```
--    is the unique identifier for the layer procedure set.
--
-- meb.session^key
--
--    int(32) : ref : *
--
--    is the address of the session^q.
--
-- ================================================================ int(32) proc find^cb( lpsid, session^key );
    int      lpsid;
    int .ext session^key( session^q^def );
  begin int .ext cb;

-- check for bad address
    if (@session^key <= 0d) then
     return -1d;

-- search the session queue
    if ( @cb := dequeue( session^key, lpsid )) <= 0d then
     return -1d;

-- return the address
    return @cb;

end; -- find^cb
?page "d e a l l o c a t e ^ c b"
-- ================================================================
--
-- The deallocate^cb procedure will deallocate a layer procedure set
-- control block and return it to the memory pool.
--
-- ================================================================
--
-- call deallocate^cb( meb.session^key                    (i)
--                   , cb );                              (i)
--
-- meb.session^key
--
--    int(32) : ref : *
--
--    is the address of the session^q to deallocate from.
--
-- cb
--
--    int(32) : ref : *
--
--    is the address of the control block to deallocate.
--
-- ================================================================ proc deallocate^cb( q^head, q^element );
    int .ext session^q( q^head^def ); -- really meb.session^key
    int .ext cb( q^element^def );
  begin int .ext cb;   -- cb.q^element.element^id is the LPSID -- check for bad addresses
    if (@session^q <= 0d) or (@q^element <= 0d) then
      return;

-- check to see if element was dequeued
    if (@cb := find^cb( session^q, cb.q^element.element^id )) > 0d then
      call dequeue( session^q, cb.q^element.element^id );

-- deallocate the cb
    call put^buffer( cb );

end; -- deallocate^cb
```

```
?page "g e t ^ b u f f e r"
-- =====================================================================  --
--                                                                        --
-- The get^buffer procedure will dynamically allocate a block of memory   --
-- from the memory pool and optionally initialize the block of data.      --
--                                                                        --
-- =====================================================================  --
--
-- @address := get^buffer( byte^length                         (i)        --
--                       , [fill] );                           (i)        --
--                                                                        --
-- @address                                                                --
--                                                                        --
--    int(32) : ref : returned address                                    --
--                                                                        --
--    is the address of the new block of memory. Value will be null if    --
--    memory allocation failed.                                           --
--                                                                        --
-- byte^length                                                             --
--                                                                        --
--    int : value                                                         --
--                                                                        --
--    is the number of bytes needed.                                      --
--                                                                        --
-- fill                                                                   --
--                                                                        --
--    int : value                                                         --
--                                                                        --
--    is the value to use for initializing the block of data.             --
--                                                                        --
-- =====================================================================  --

?page
  int(32) proc get^buffer( bytes^needed , fill ) variable;
    int bytes^needed;
    int fill;
  begin int    .ext block^addr;
    string .ext s^block^addr;
    int         use^fill;

-- check to see if bytes^needed was sent
    if not ($param(bytes^needed)) then
      begin
        call get^buffer^failure( 0 );
        return -1d;
      end;

if (bytes^needed <= 0) then
      return -1d;

-- check access to pool
    call getpool(x^pool^head, 0d);
    if <> then
      begin
        call get^buffer^failure( 1 );
        return -1d;
      end;
    -- allocate block
    @block^addr := getpool(x^pool^head, $udbl(bytes^needed));
    if <> then
      begin
        call get^buffer^failure( 2 );
        return -1d;
      end;

if ($param(fill)) then
      use^fill := fill
    else
      use^fill := lib^filler;
```

```
-- initialize blocks to fill value
@s^block^addr := @block^addr;
s^block^addr[0] := use^fill;
s^block^addr[1] ':=' s^block^addr[0] for (bytes^needed - 1);

-- return address of block
return @block^addr;

end; -- get^buffer;

?page "p u t ^ b u f f e r"
-- ================================================================ --
--                                                                   --
-- The put^buffer procedure will dynamically deallocate a block of pool --
-- memory and return a -1d upon a normal completion.                 --
--                                                                   --
-- ================================================================ --
--                                                                   --
-- @addr  := put^buffer( addr );                         (i)         --
--                                                                   --
-- @addr                                                              --
--                                                                   --
--     int(32) : ref : *                                              --
--                                                                   --
--     is returned -1d if operation completes; 0d if operation fails. --
--                                                                   --
-- block^address                                                      --
--                                                                   --
--     int(32) : ref : *                                              --
--                                                                   --
--     is the address of the block to be returned to the pool.        --
--                                                                   --
-- ================================================================ -- int(32) proc put^buffer( block^addr );
      int .ext block^addr;
   begin int(32) .ext poolhead;

@poolhead := @x^pool^head;

-- check for boundry violations
      if (@block^addr < poolhead[2] or @block^addr > poolhead[3]) then
         return $dbl(false)
      else
         begin
            call putpool( x^pool^head, block^addr );
            if < then return $dbl(false);
         end;

-- return ok
      return $dbl(true);

end; -- put^buffer
```

What is claimed is:

1. A computer apparatus for performing procedures in connection with one or more terminals, each of said terminals being capable of communicating with said computer in a session, comprising:

execution means responsive to a communication from a given one of said terminals for initializing and carrying out a given session with the given terminal, said execution means including means for creating a given session identifier for identifying the given session; said execution means further comprising:

first means for creating a given message event block (MEB) for the given session, said given MEB containing the given session identifier for the given session and an event connected with the given terminal; and second means responsive to said first means for executing one or more procedures contained in one or more layered procedure sets (LPSs) as required by said event in said given MEB, said executing by said second means when requiring messages to be transferred in said given session between LPSs, transferring said messages with said MEB, each LPS including a self contained group of procedures and being identifiable by a LPS identifier, said executing by said second means of a procedure in a given LPS for said given session including establishing a given control block (CB) for the given LPS, said given CB being identifiable by the LPS identifier for the given LPS and the given session identifier for that given session and carrying messages within the given LPS.

2. A computer apparatus in accordance with claim 1 wherein:

for said given session, said second means executes a procedure of a given LPS with the given LPS only having access to a CB having the given session identifier and the LPS identifier of the given LPS.

3. A computer apparatus in accordance with claim 1 wherein:

for said given session and said given LPS, said establishing by said second means of said given CB is the only establishing of a CB by said second means for said given LPS.

4. A computer apparatus in accordance with claim 1 wherein:

said executing by said second means of a procedure in a given LPS for said given session is such that the given LPS only is given access to a CB whose session identifier is the same as said given session identifier of said given MEB.

5. A computer apparatus in accordance with claim 1 wherein:

said execution means is responsive to communications from first and second of said one or more terminals for initializing and carrying out first and second sessions with said first and second terminals concurrently, said means for creating said given identifier of said execution means creating first and second identifiers for identifying said first and second sessions respectively;

said first means creating first and second MEBs for said first and second sessions, respectively, said first MEB containing said first session identifier of said first session and a first event connected with said first terminal and said second MEB containing said second session identifier of said second session and a second event connected with said second terminal;

and said second means concurrently executing one or more procedures in said LPSs as required by said first event in said first MEB and as required by said second event in said second MEB, said executing by said second means when required by said first event in said first MEB to transfer messages between LPSs, transferring said messages with said first MEB, and said executing by said second means when required by said second event in said second MEB to transfer messages between LPSs, transferring said messages with said second MEB said executing by said second means of a procedure in a first LPS for said first session including establishing a first CB identifiable with said first session identifier for the first session and with the LPS identifier for the first LPS and said executing by said second means of a procedure in said first LPS for said second session including establishing a second CB identifiable with the second session identifier for the second session and with the LPS identifier for the first LPS said first CB carrying messages within said first LPS for the first session and said second CB carrying messages within said first LPS for the second session.

6. A computer apparatus in accordance with claim 1 further comprising:

means for storing said given CB established for said given LPS in a storage area;

and said executing by said second means of said given LPS further includes retrieval of said given CB from said storage area by identifying the LPS identifier for the given LPS and the given session identifier of the given session.

7. A computer apparatus in accordance with claim 1 wherein:

said second means in executing a procedure in a given LPS enters the given LPS through a single entry procedure and exists the given LPS through a single exit procedure.

8. A computer apparatus in accordance with claim 1 wherein:

said second means includes Schedule-Dispatcher means for controlling the transferring of MEBs between said LPSs.

9. A method implemented on a computer used in connection with one or more terminals, each of said terminals being capable of communicating with said computer in a session, said method comprising:

initializing and carrying out a given session with a given terminal with an execution means of said computer in response to a communication from said given terminal to said execution means, said step of initializing and carrying out said given session including creating a given session identifier for identifying the given session, said step of initializing and carrying out said given session further including:

creating a given message event block (MEB) for the given session, said given MEB containing the given session identifier for the given session and an event connected with the given terminal; and executing one or more procedures contained in one or more layered procedure sets (LPSs) as required by said event in said given MEB, said executing when requiring messages to be transferred in said given session between LPSs, transferring said messages with said MEB, each LPS including a self contained group of procedures and being identifiable by a LPS identifier, said step of executing a procedure in a given LPS in said given session including establishing a given control block (CB) for the given LPS, said given CB being identifiable by the LPS identifier for the given LPS and the given session identifier for the given session and carrying messages within the given LPS.

10. A method in accordance with claim 9 wherein:

for said given session, said step of executing a procedure of a given LPS is such that the given LPS only has access to a CB having the given session identifier and the LPS identifier of the given LPS.

11. A method in accordance with claim 9 wherein:

for said given session and a given LPS, said step of establishing establishes only said given CB.

12. A method in accordance with claim 9 wherein:

said step of executing a procedure in a given LPS for said given session is such that the given LPS only is given access to a CB whose session identifier is the same as said given session identifier of said given MEB.

13. A method in accordance with claim 9 wherein:

said step of initializing and carrying out a session including initializing and carrying out first and second sessions with said first and second terminals, respectively, and said step of creating said identifier including creating first and second identifiers for identifying said first and second sessions, respectively;

said step of creating an MEB creating first and second MEBs for said first and second sessions, respectively, said first MEB containing a session identifier of said first session and a first event connected with said first terminal and said second MEB containing said session identifier of said second session and a second event connected with said second terminal;

and said step of executing a procedure concurrently executing one or more procedures in said one or more LPSs as required by said first event in said first MEB and as required by said second event in said second MEB, said executing when required by said first event in said first MEB to transfer messages between LPSs, transferring said messages with said first MEB, and said executing when required by said second event in said second MEB to transfer messages between LPSs, transferring said messages with said second MEB, said executing of a procedure in a first LPS for said first session including establishing a first CB identifiable with said first session identifier for the first session and with the LPS identifier for the first LPS and said executing of a procedure in said first LPS for said second session including establishing a second CB identifiable with the second session identifier for the second session and with the LPS identifier for the first LPS said first CB carrying messages within said first LPS for the first session and said second CB carrying messages within said first LPS for the second session.

14. A method in accordance with claim 9 further comprising:
   storing said given CB established for said given LPS in a storage area;
   and said executing of said given LPS further includes retrieval of said given CB from said storage area by identifying the LPS identifier for the given LPS and the given session identifier of the given session.

15. A method in accordance with claim 9 wherein:
   said executing a procedure in a given LPS enters the LPS through a single entry procedure and exits the LPS through a single exit procedure.

16. A method in accordance with claim 9 wherein:
   said executing step includes using a Schedule-Dispatcher to control the transfer of MEBs between said LPSs.

* * * * *

UNITED STATES PATENT AND TRADEMARK OFFICE
CERTIFICATE OF CORRECTION

PATENT NO. : 5,392,426
DATED : February 21, 1995
INVENTOR(S) : Artur Urbanski et al.

It is certified that error appears in the above-indentified patent and that said Letters Patent is hereby corrected as shown below:

Col. 4, line 20.  After "FIGS. 7-21" insert -- show --.

Col. 4, line 48.  Change "taken" to -- taking --.

Col. 6, line 44.  Change "A1-A13" to -- A1-A16 --.

Col. 7, line 9.   Change "MEB<B)" to -- MEB(B) --.

Col. 7, line 55.  After "disk" insert -- io. --.

Col. 8, line 18.  Change "MEB(A)A" to -- MEB(A) --.

Col. 8, line 23.  Delete "with" (second occurrence).

Col. 34, line 5.  Change "exists" to -- exits --.

Col. 36, line 1.  After "LPS" insert -- , --.

Signed and Sealed this

Thirteenth Day of June, 1995

Attest:

BRUCE LEHMAN

*Attesting Officer*    *Commissioner of Patents and Trademarks*